(12) United States Patent
Kim (10) Patent No.: US 11,556,252 B2
(45) Date of Patent: Jan. 17, 2023

(54) STORAGE DEVICE AND METHOD OF OPERATING THE SAME

(71) Applicant: SK hynix Inc., Icheon (KR)

(72) Inventor: Jin Pyo Kim, Icheon (KR)

(73) Assignee: SK hynix Inc., Icheon (KR)

( * ) Notice: Subject to any disclaimer, the term of this patent is extended or adjusted under 35 U.S.C. 154(b) by 72 days.

(21) Appl. No.: 17/174,869

(22) Filed: Feb. 12, 2021

(65) Prior Publication Data

US 2022/0050604 A1  Feb. 17, 2022

(30) Foreign Application Priority Data

Aug. 14, 2020 (KR) .......................... 10-2020-0102793

(51) Int. Cl.
*G06F 3/06* (2006.01)
*G06F 21/31* (2013.01)

(52) U.S. Cl.
CPC .......... *G06F 3/0622* (2013.01); *G06F 3/0655* (2013.01); *G06F 3/0679* (2013.01); *G06F 21/31* (2013.01)

(58) Field of Classification Search
CPC .... G06F 3/0622; G06F 3/0623; G06F 3/0637; G06F 3/0655; G06F 3/0659; G06F 3/0679; G06F 3/0688; G06F 21/31; G06F 21/33
USPC ........... 711/152, 163, 164; 726/7, 10, 28, 29
See application file for complete search history.

(56) References Cited

U.S. PATENT DOCUMENTS

| | | | |
|---|---|---|---|
| 8,869,305 B1 * | 10/2014 | Huang ................. | G06F 21/31 380/258 |
| 11,132,425 B1 * | 9/2021 | Cohen ................ | G06Q 20/4093 |
| 2013/0055370 A1 * | 2/2013 | Goldberg ............... | G06F 21/31 726/7 |
| 2014/0157381 A1 * | 6/2014 | Disraeli .............. | H04L 63/0853 726/7 |
| 2016/0156609 A1 * | 6/2016 | Grigg ..................... | H04L 63/08 726/7 |

FOREIGN PATENT DOCUMENTS

KR  101254604 B1  4/2013
KR  20170056681 A  5/2017

\* cited by examiner

*Primary Examiner* — Gary J Portka (57) ABSTRACT

A storage device for providing an improved security function may include a nonvolatile memory device, a position information generator generating first position information indicating a first geographical position of the nonvolatile memory device when an authentication request is input, a user information storage storing user information for accessing the nonvolatile memory device, the user information including second position information, and an access controller obtaining, in response to an authentication request provided from an external host, the first position information from the position information generator, and disposing of data stored in the nonvolatile memory device depending on whether the second position information included in the user information matches the first position information.

20 Claims, 9 Drawing Sheets

Authentication Request

| USER ID | PASSWORD | USER STATUS (New or Registered) |
|---|---|---|

Authentication Response

| AUTHENTICATION STATUS (Success or Fail) | DATA STATUS (Maintain or Disposal) | USER INFORMATION GENERATION STATUS (Completed / Not Applicable) |
|---|---|---|

STORAGE DEVICE AND METHOD OF OPERATING THE SAME

CROSS-REFERENCE TO RELATED APPLICATION

The present application claims priority under 35 U.S.C. § 119(a) to Korean patent application number 10-2020-0102793, filed on Aug. 14, 2020, in the Korean Intellectual Property Office, the entire disclosure of which is incorporated herein by reference.

BACKGROUND

1. Technical Field

Various embodiments of the present disclosure generally relate to an electronic device, and more particularly to a storage device and a method of operating the storage device.

2. Related Art

A storage device is a device which stores data under the control of a host device such as a computer or a smartphone. The storage device may include a memory device in which data is stored and a memory controller which controls the memory device. Memory devices may be classified into a volatile memory device and a nonvolatile memory device.

The volatile memory device may be a memory device in which data is stored only when power is supplied and in which stored data is lost when the supply of power is interrupted. Examples of the volatile memory device may include a static random access memory (SRAM) and a dynamic random access memory (DRAM).

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to a storage device for providing an improved security function and a method of operating the storage device.

An embodiment of the present disclosure may provide for a storage device. The storage device may include a nonvolatile memory device, a position information generator configured to generate first position information indicating a first geographical position of the nonvolatile memory device when an authentication request is input, a user information storage configured to store user information for accessing the nonvolatile memory device, the user information including second position information and an access controller configured to, in response to an authentication request provided from an external host, obtain the first position information from the position information generator, and dispose of data stored in the nonvolatile memory device depending on whether the second position information included in the user information matches the first position information.

An embodiment of the present disclosure may provide for a method of operating a storage device, the storage device including a nonvolatile memory device and a memory controller for controlling the nonvolatile memory device. The method may include in response to an authentication request for the storage device that is input from an external host, generating first position information indicating a first geographical position of the storage device when the authentication request is input and processing the authentication request depending on whether the first position information matches second position information included in registered user information, the registered user information having been stored before the authentication request is input.

DETAILED DESCRIPTION

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Figure 1:
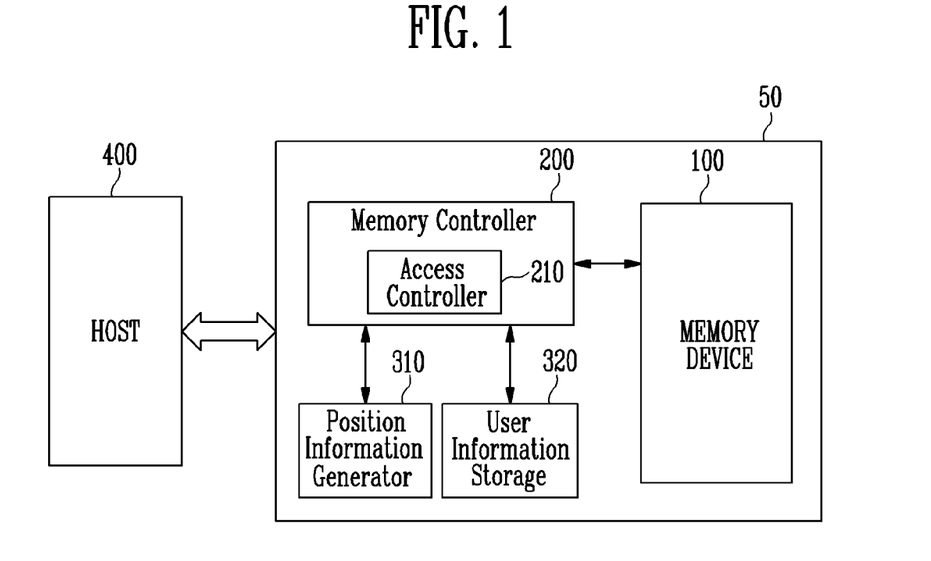
FIG. 1 is a diagram illustrating a storage device according to an embodiment of the present disclosure.

FIG. 1 is a diagram illustrating a storage device 50 according to an embodiment of the present disclosure.

Referring to FIG. 1, the storage device 50 may include a memory device 100, a memory controller 200, a position information generator 310, and a user information storage 320. The storage device 50 may be a device which stores data under the control of a host 400, such as a mobile phone, a smartphone, an MP3 player, a laptop computer, a desktop computer, a game console, a TV, a tablet PC, or an in-vehicle infotainment system. Alternatively, the storage device 50 may be a device which stores high-capacity data in a specific place, such as a server or a data center, under the control of the host 400.

The storage device 50 may be manufactured as any one of various types of storage devices depending on a host interface which is a scheme for communication with the host 400. For example, the storage device 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may operate in response to the control of the memory controller 200. The memory device 100 may include a memory cell array (not illustrated) including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array (not illustrated) may include a plurality of memory blocks. Each memory block may include a plurality of memory cells. A single memory block may include a plurality of pages. In an embodiment, a page may be a unit by which data is stored in the memory device 100 or by which data stored in the memory device 100 is read. A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In the present specification, for convenience of description, various embodiments may be described based on the assumption that the memory device 100 is a NAND flash memory.

The memory device 100 may receive a command and an address from the memory controller 200, and may access the area of the memory cell array, selected by the address. The memory device 100 may perform an operation indicated by the command on the area selected by the address. For example, the memory device 100 may perform a write operation (i.e., a program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory controller 200 may control the overall operation of the storage device 50.

When power is applied to the storage device 50, the memory controller 200 may run firmware (FW). When the memory device 100 is a flash memory device, the memory controller 200 may run firmware such as a flash translation layer (FTL) for controlling communication between the host 400 and the memory device 100.

In an embodiment, the memory controller 200 may receive data and a logical block address (LBA) from the host 400, and may translate the logical block address (LBA) into a physical block address (PBA) indicating the address of memory cells which are included in the memory device 100 and store data therein.

The memory controller 200 may control the memory device 100 so that a program operation, a read operation, or an erase operation is performed in response to a request received from the host 400. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may autonomously generate a command, an address, and data regardless of whether a request from the host 400 is received, and may transmit them to the memory device 100. For example, the memory controller 200 may provide the memory device 100 with commands, addresses, and data required in order to perform program, read, and erase operations that are involved in performing wear leveling, read reclaim, garbage collection, etc.

In an embodiment, the memory controller 200 may control at least two memory devices 100. In this case, the memory controller 200 may control the memory devices 100 depending on an interleaving scheme to improve operating performance. The interleaving scheme may be a scheme for controlling the memory devices 100 so that the operations of at least two memory devices 100 are caused to overlap each other.

The memory controller 200 may include an access controller 210.

The access controller 210 may block or allow access by the host 400 to the storage device 50.

The access controller 210 provides a data security function for a geographical position. In detail, the access controller 210 may store information about a first geographical position occurring when a user who is registered with the storage device 50 initially registers user information, and may allow access to the storage device 50 depending on whether a second geographical position occurring when the user requests access to the storage device 50 is substantially identical to the previously stored first geographical position. By means of this operation, the storage device 50 provides not only a user-based security function which allows data access by a specific user but also a geographical security function which prevents the storage device 50 from being accessed in places other than a designated geographical position, as in the case where the storage device 50 which stores data is stolen.

The position information generator 310 may generate position information indicating the geographical position of the storage device 50. The position information generator 310 may be operated under the control of the memory controller 200. The position information generator 310 may generate position information under the control of the memory controller 200, and may provide the generated position information to the memory controller 200.

The position information generator 310 may generate the position information of the storage device 50 using information provided by a global positioning system (GPS). The position information generator 310 may receive GPS signals directly from satellites or receive GPS signals through a communication network, such as a long-term evolution (LTE) or Wi-Fi network. The position information generator 310 may generate the position information of the storage device 50 using the received GPS signals. The position information may include information about the geographical position of the storage device 50. For example, the position information may include information about latitude and longitude at which the storage device 50 is located. In an embodiment, the position information generator 310 may encrypt information about latitude and longitude. For example, the position information generator 310 may generate the position information by encrypting the information about latitude and longitude based on at least one of symmetric key encryption algorithms, such as Advanced Encryption Standard (AES) and Data Encryption Standard (DES) algorithms, and asymmetric key encryption algorithms, such as Rivest-Shamir-Adleman (RSA) and Elliptic Curve Cryptography (ECC) algorithms.

The user information storage 320 may store user information. The user information may be information about a user having authority to access the storage device 50.

For example, the user information may include registered user information and administrator information.

The registered user information may be generated when the host 400 initially accesses the storage device 50. In detail, the access controller 210 may receive an authentication request from the host 400. The authentication request may include a user identification (ID), a password, and user status information. The user status information may indicate whether the input user ID and the password correspond to information of a user to be newly registered or correspond to an access request made by a previously registered user. For example, the user status information may indicate whether the user ID and the password correspond to information of a new user or information of a previously registered user.

The access controller 210 may request the position information generator 310 to generate position information in response to the authentication request input from the host 400, and may receive generated position information from the position information generator 310.

In an embodiment, when the input user ID and password indicate the information of a user to be newly registered, the access controller 210 may store user information including the user ID, the password and the generated position information, as registered user information, in the user information storage 320. The user ID and the password may be included in the authentication request.

The access controller 210 may provide an authentication response including information indicating that the user information has been registered to the host 400.

In various embodiments, when the input user ID and password indicate an access request made by a previously registered user, the access controller 210 may authenticate the user based on the registered user information stored in the user information storage 320, and the user ID and the password, which are contained in the authentication request, and the generated position information.

The registered user information may contain a registered user ID, a registered user password, and registered user position information. Here, the registered user position information may be position information generated when the registered user information is stored.

The access controller 210 may dispose of the data stored in the memory device 100 depending on whether the registered user position information matches the generated position information. When the data is disposed of, the access controller 210 may provide the host 400 with an authentication response indicating that the authentication request has failed and that the data stored in the memory device 100 has been disposed of. The "disposing of data" used in the specification may indicate one or more of deleting data stored in a storage device, making data stored in a storage device inaccessible, and making the deleted data irrecoverable.

When the registered user position information matches the generated position information, the access controller 210 may determine whether the registered user ID and the registered user password match the user ID and password contained in the authentication request, and may determine, based on the result of the determination, whether authentication has succeeded or failed.

When it is determined that the registered user ID and the registered user password match the user ID and password contained in the authentication request, the access controller 210 may provide the host 400 with an authentication response indicating that authentication has succeeded. Alternatively, when it is determined that the registered user ID and the registered user password do not match the user ID and password contained in the authentication request, the access controller 210 may provide the host 400 with an authentication response indicating that authentication has failed.

In an embodiment, the administrator information may include administrator ID information, administrator password information, and administrator position information. The administrator ID information and the administrator password information may be generated in advance, and may be provided only to limited users. When the user ID and password contained in the authentication request are the administrator ID information and the administrator password information, an operation mode may enter an administrator mode. However, even if an authentication request made based on the administrator ID is received, a security function depending on the geographical position cannot be provided when access is unlimitedly permitted. Therefore, when an authentication request made based on the administrator ID is input and registered user information is previously stored in the user information storage 320, the access controller 210 may replace the registered user position information included in the registered user information with the administrator position information. That is, the access controller 210 may determine whether to enter the administrator mode depending on whether the position information occurring when the authentication request is input matches the registered user position information.

The access controller 210 may delete the registered user information under the control of the host 400 only after having entered the administrator mode. That is, the administrator mode provides only a function of deleting registered user information, and the registration of new user information is possible only when registered user information is not present.

By means of the provision of the above-described security function depending on the geographical position, when the storage device 50 is stolen, the security of the data stored in the storage device 50 may be strengthened. The security function depending on the geographical position will be described in detail later with reference to FIGS. 4 to 7.

The host 400 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
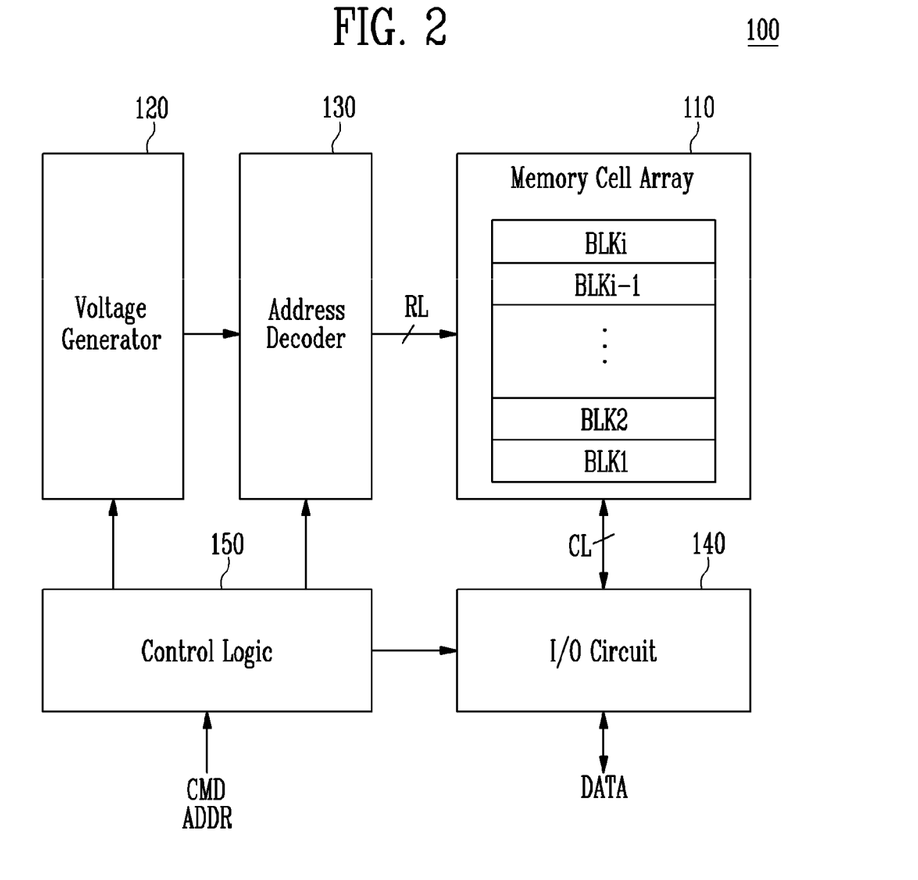
FIG. 2 is a diagram illustrating a memory device of FIG. 1 according to an embodiment.

FIG. 2 is a diagram illustrating a memory device 100 suitable for used as the memory device 100 of FIG. 1 according to an embodiment.

Referring to FIG. 2, the memory device 100 may include a memory cell array 110, a voltage generator 120, an address decoder 130, an input/output (I/O) circuit 140, and a control logic 150.

The memory cell array 110 includes a plurality of memory blocks BLK1 to BLKi. The plurality of memory blocks BLK1 to BLKi may be coupled to the address decoder 130 through row lines RL. The plurality of memory blocks BLK1 to BLKi may be coupled to the input/output circuit 140 through column lines CL. In an embodiment, the row lines RL may include word lines, source select lines, and drain select lines. In an embodiment, the column lines CL may include bit lines.

Each of the memory blocks BLK1 to BLKi includes a plurality of memory cells. In an embodiment, the plurality of memory cells may be nonvolatile memory cells. Memory cells coupled to the same word line, among the plurality of memory cells, may be defined as one physical page. That is, the memory cell array 110 may include a plurality of physical pages. Each of the memory cells of the memory device 100 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

In an embodiment, the voltage generator 120, the address decoder 130, and the input/output circuit 140 may be collectively designated as a peripheral circuit. The peripheral circuit may drive the memory cell array 110 under the control of the control logic 150. The peripheral circuit may drive the memory cell array 110 so as to perform a program operation, a read operation, and an erase operation.

The voltage generator 120 may generate a plurality of operating voltages using an external supply voltage that is supplied to the memory device 100. The voltage generator 120 may be operated under the control of the control logic 150.

In an embodiment, the voltage generator 120 may generate an internal supply voltage by regulating the external supply voltage. The internal supply voltage generated by the voltage generator 120 is used as an operating voltage for the memory device 100.

In an embodiment, the voltage generator 120 may generate the plurality of operating voltages using the external supply voltage or the internal supply voltage. The voltage generator 120 may generate various voltages required by the memory device 100. For example, the voltage generator 120 may generate a plurality of erase voltages, a plurality of program voltages, a plurality of pass voltages, a plurality of select read voltages, and a plurality of unselect read voltages.

The voltage generator 120 may include a plurality of pumping capacitors for receiving the internal supply voltage so as to generate a plurality of operating voltages having various voltage levels, and may generate the plurality of operating voltages by selectively enabling the plurality of pumping capacitors under the control of the control logic 150.

The generated operating voltages may be supplied to the memory cell array 110 by the address decoder 130.

The address decoder 130 is coupled to the memory cell array 110 through the row lines RL. The address decoder 130 may be operated under the control of the control logic 150. The address decoder 130 receives addresses from the control logic 150. The address decoder 130 may decode a block address, among the received addresses. The address decoder 130 may select at least one of the memory blocks BLK1 to BLKi according to the decoded block address. The address decoder 130 may decode a row address, among the received addresses. The address decoder 130 may select at least one of word lines of the selected memory block according to the decoded row address. In an embodiment, the address decoder 130 may decode a column address, among the received addresses. The address decoder 130 may couple the input/output circuit 140 to the memory cell array 110 according to the decoded column address.

In an embodiment, the address decoder 130 may include components such as a row decoder, a column decoder, and an address buffer.

The input/output (I/O) circuit 140 may include a plurality of page buffers. The plurality of page buffers may be coupled to the memory cell array 110 through the bit lines. During a program operation, data may be stored in selected memory cells based on the data stored in the plurality of page buffers.

During a read operation, the data stored in the selected memory cells may be sensed through bit lines, and the sensed data may be stored in the page buffers.

The control logic 150 may control the address decoder 130, the voltage generator 120, and the input/output circuit 140. The control logic 150 may be operated in response to a command CMD transferred from an external device. The control logic 150 may control the peripheral circuit by generating control signals in response to the command CMD and the addresses ADDR.

Figure 3:
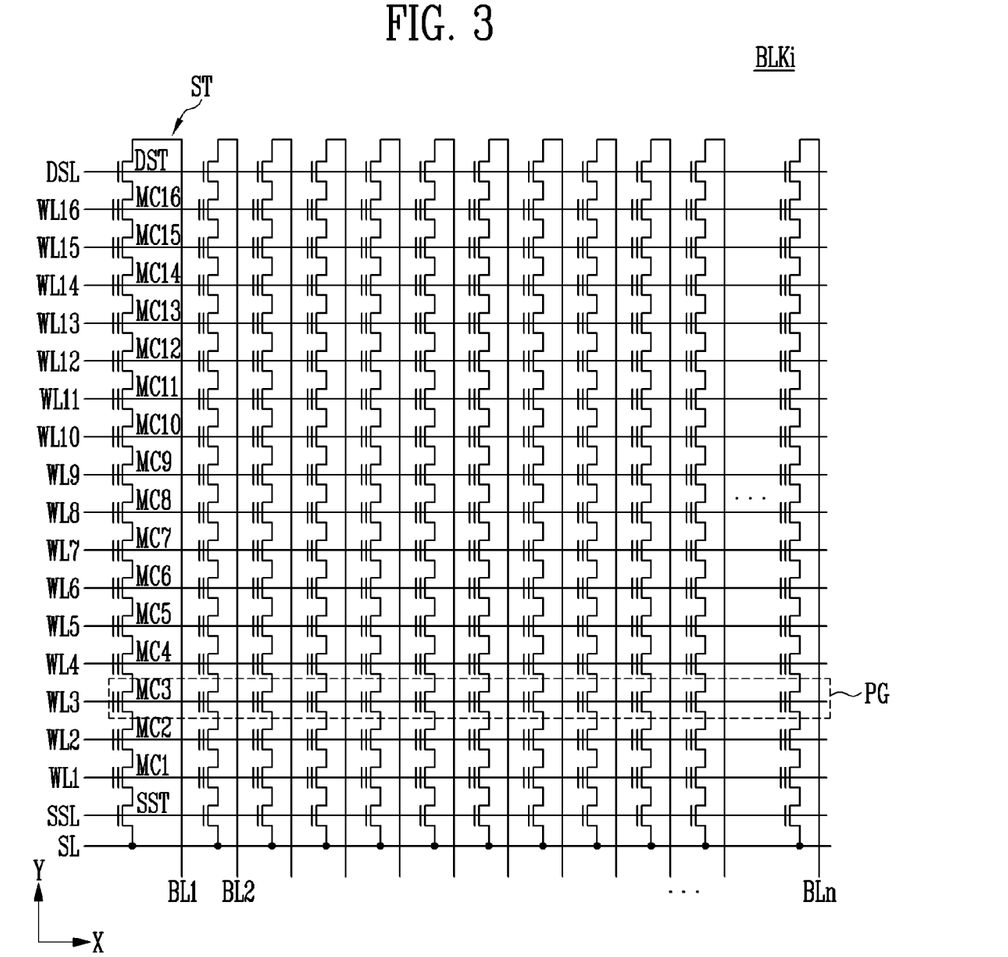
FIG. 3 is a diagram illustrating the structure of a memory block of FIG. 2 according to an embodiment.

FIG. 3 is a diagram illustrating the structure of any one of memory blocks BLK1 to BLKi of FIG. 2.

Although the memory block in FIG. 3 is denoted by the reference character BLKi, the memory block in FIG. 3 may indicate any one of the memory blocks BLK1 to BLKi of FIG. 2.

Referring to FIG. 3, a plurality of word lines arranged in parallel to each other may be coupled between a first select line and a second select line. Here, the first select line may be a source select line SSL, and the second select line may be a drain select line DSL. In detail, the memory block BLKi may include a plurality of strings ST coupled between bit lines BL1 to BLn and a source line SL. The bit lines BL1 to BLn may be coupled to the strings ST, respectively, and the source line SL may be coupled in common to the strings ST. The strings ST may be equally configured, and thus the string ST coupled to the first bit line BL1 will be described in detail by way of example.

The string ST may include a source select transistor SST, a plurality of memory cells MC1 to MC16, and a drain select transistor DST which are coupled in series to each other between the source line SL and the first bit line BL1. A single string ST may include at least one source select transistor SST and at least one drain select transistor DST, and may include more memory cells than the memory cells MC1 to MC16 illustrated in the drawing.

A source of the source select transistor SST may be coupled to the source line SL, and a drain of the drain select transistor DST may be coupled to the first bit line BL1. The memory cells MC1 to MC16 may be coupled in series between the source select transistor SST and the drain select transistor DST. Gates of the source select transistors SST included in different strings ST may be coupled to the source select line SSL, gates of the drain select transistors DST included in different strings ST may be coupled to the drain select line DSL, and gates of the memory cells MC1 to MC16 may be coupled to a plurality of word lines WL1 to WL16, respectively. A group of memory cells coupled to the same word line, among the memory cells included in different strings ST, may be referred to as a physical page (PG). Therefore, the memory block BLKi may include a number of physical pages (PG) identical to the number of word lines WL1 to WL16.

One memory cell may store one bit of data. This cell is typically designated as a single-level cell (SLC). In this case, one physical page (PG) may store data corresponding to one logical page (LPG). The data corresponding to one logical page (LPG) may include a number of data bits identical to the number of cells included in one physical page (PG).

One memory cell may store two or more bits of data. In this case, one physical page (PG) may store data corresponding to two or more logical pages (LPG).

Figure 4:
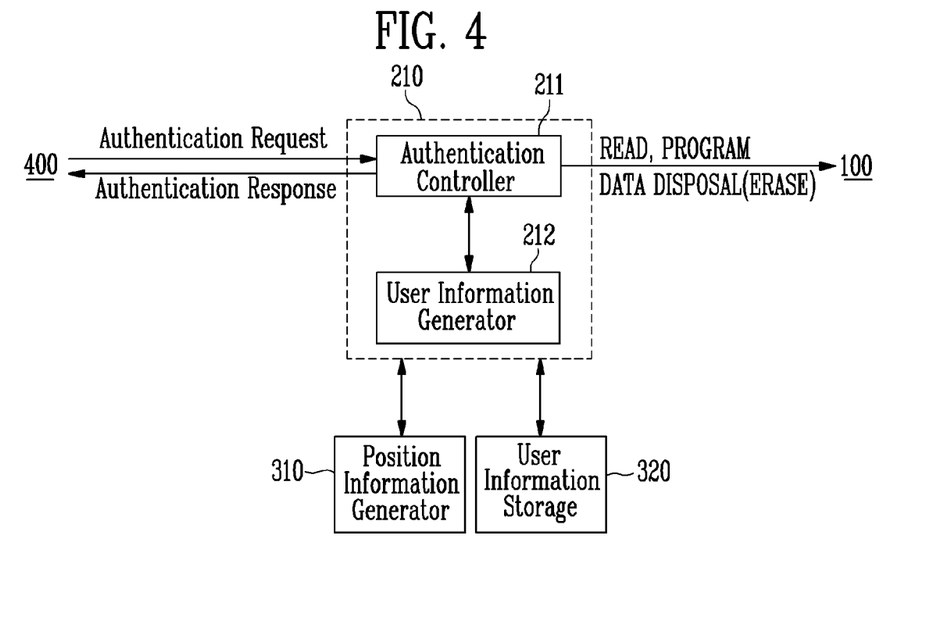
FIG. 4 illustrates an operation of an access controller of FIG. 1 according to an embodiment.

FIG. 4 illustrates an operation of an access controller (e.g., the access controller 210 of FIG. 1) according to an embodiment.

Referring to FIG. 4, the access controller 210 may include an authentication controller 211 and a user information generator 212.

The authentication controller 211 may receive an authentication request from a host (e.g., the host 400 in FIG. 1). The authentication controller 211 may provide an authentication response including the result of authentication to the host 400. The authentication controller 211 may provide a command to a memory device (e.g., the memory device 100 in FIG. 1) for disposing of data stored in the memory device 100 based on the result of authentication.

In detail, the authentication controller 211 may instruct the position information generator 310 to generate position information in response to the authentication request received from the host 400, and may receive current position information generated by the position information generator 310. Here, the current position information may include information about a storage device (e.g., the storage device 50 including the memory device 100) occurring when the authentication request is received.

The position information generator 310 may generate the position information of the storage device (e.g., the storage device 50 including the memory device 100) using GPS signals provided by a global positioning system (GPS). The position information generator 310 may receive GPS signals directly from satellites or receive GPS signals through a communication network, such as a long-term evolution (LTE) or Wi-Fi network. The position information generator 310 may generate the position information of the storage device using the received GPS signals. The position information may include information about a geographical position of the storage device. For example, the position information may include information about latitude and longitude at which the storage device is located. In an embodiment, the position information generator 310 may encrypt information about latitude and longitude. For example, the position information generator 310 may generate the position information by encrypting the information about latitude and longitude based on at least one of symmetric key encryption algorithms, such as Advanced Encryption Standard (AES) and Data Encryption Standard (DES) algorithms, and asymmetric key encryption algorithms, such as Rivest-Shamir-Adleman (RSA) and Elliptic Curve Cryptography (ECC) algorithms.

The authentication request provided by the host 400 may include a user ID, a password, and user status information. The user status information may indicate whether the user ID and the password included in the authentication request correspond to information of a new user required to be registered or correspond to an access request made by a previously registered user.

The authentication controller 211 may control the user information generator 212 to generate user information when the user status information indicates that the input user ID and password correspond to the information of the new user.

The user information generator 212 may generate user information under the control of the authentication controller 211. In detail, the user information generator 212 may generate user information including the user ID and password included in the authentication request and the current position information generated by the position information generator 310. Here, the user information generator 212 may encrypt the user ID, the password, and the current position information generated by the position information generator 310. For this, the user information generator 212 may include an encryptor (not illustrated). In an embodiment, the user information generator 212 may individually encrypt the user ID, the password, and the current position information.

The authentication controller 211 may control the user information storage 320 so that the user information generated by the user information generator 212 is stored as registered user information. In an embodiment, the user information storage 320 may be a volatile memory device. In various embodiments, the user information storage 320 may include a map table which stores mapping relationships between logical block addresses provided by the host 400 and physical block addresses at which data is stored in the memory device 100.

When the user information is registered, the authentication controller 211 may provide the host 400 with an authentication response including information indicating that the user information has been registered.

In various embodiments, the authentication request may be an authentication request which requests access by a registered user to the storage device.

When the user status information included in the authentication request is an access request made by a previously registered user, the authentication controller 211 may authenticate the user based on the registered user information stored in the user information storage 320, the user ID and password included in the authentication request, and the current position information generated by the position information generator 310.

The registered user information stored in the user information storage 320 may contain a registered user ID, a registered user password, and registered user position information. Here, the registered user position information may be position information generated when the registered user information is stored.

The authentication controller 211 may obtain the registered user position information from the registered user information stored in the user information storage 320. Since the registered user information is encrypted data, the authentication controller 211 may obtain the registered user position information by decrypting the registered user information. For this, the authentication controller 211 may further include a decryptor (not illustrated). In an embodiment, the decryptor (not illustrated) may decrypt the registered user information using a decryption method corresponding to an encryption algorithm used by the encryptor (not illustrated) included in the user information generator 212.

The authentication controller 211 may determine whether the registered user position information matches the current position information generated by the position information generator 310. When the registered user position information does not match the current position information generated by the position information generator 310, the authentication controller 211 may control the memory device 100 so that the data stored in the memory device 100 is disposed of because the geographical position of the storage device (e.g., the storage device 50 including the memory device 100) has changed. In an embodiment, the disposal of data may be performed by allowing the authentication controller 211 to provide an erase command for the memory blocks in which data is stored, among memory blocks included in the memory device 100, to the memory device 100. In an embodiment, the authentication controller 211 may dispose of the data by deleting the map table stored in the user information storage 320 or by performing an unmap operation of releasing mapping relationships between logical block addresses and physical block addresses included in the map table, to make the data stored in the memory device 100 inaccessible. In an embodiment, the authentication controller 211 may delete parity data or key values used for decoding so that data included in the memory device 100 cannot be recovered. Thereafter, the authentication controller 211 may provide the host 400 with an authentication response indicating that the authentication request has failed and that the data stored in the memory device 100 has been disposed of.

When the registered user position information matches the current position information generated by the position information generator 310, the authentication controller 211 may determine whether the registered user ID and the registered user password included in the registered user information match the user ID and the user password, respectively, included in the authentication request.

When it is determined that the registered user ID and the registered user password match the user ID and the user password, respectively, included in the authentication request, the authentication controller 211 may determine that authentication has succeeded. In this case, the authentication controller 211 may provide an authentication response indicating that authentication has succeeded to the host 400.

When it is determined that the registered user ID and the registered user password do not match the user ID and the user password, respectively, included in the authentication request, the authentication controller 211 may determine that authentication has failed. For example, when the registered user ID does not match the user ID, or the registered user password does not match the user password included in the authentication request, or both, the authentication controller 211 may determine that authentication has failed. In this case, the authentication controller 211 may provide an authentication response indicating that authentication has failed to the host 400.

In an embodiment, when the user ID and the user password included in the authentication request are administrator ID information and administrator password information, the authentication controller 211 may determine whether to enter an administrator mode.

Administrator information may include an administrator ID, an administrator password, and administrator position information. The administrator ID and the administrator password may be generated at the stage of producing and testing the corresponding storage device, and may be provided only to limited users.

When the user ID and the user password included in the authentication request match the administrator ID and the administrator password, respectively, the authentication controller 211 may determine whether to enter the administrator mode depending on whether the registered user position information matches the current position information generated by the position information generator 310. That is, even if an authentication request made based on the administrator ID is received, a security function depending on the geographical position cannot be provided when access is unlimitedly permitted. Therefore, when an authentication request including the administrator ID is input and registered user information is previously stored in the user information storage 320, the authentication controller 211 may replace the registered user position information included in the registered user information with the administrator position information. When the registered user position information matches the current position information generated by the position information generator 310, the authentication controller 211 may enter the administrator mode, whereas when the registered user position information does not match the current position information, the authentication controller 211 may provide an authentication response indicating that authentication has failed to the host 400. The host 400 may control the storage device so that the registered user information is deleted only after the storage device has entered the administrator mode. When the host 400 requests the deletion of the registered user information, the authentication controller 211 may delete the registered user information stored in the user information storage 320 while disposing of (e.g., erasing) the data provided to the memory device 100.

When authentication has passed (or succeeded), the authentication controller 211 may access the memory device 100 in response to a request from the host 400. Here, access to the memory device 100 may indicate that the memory device 100 is controlled such that a program operation of storing data in the memory device 100 or a read operation of reading data stored in the memory device 100 is performed.

In an embodiment, the authentication request made by the host 400, authentication by the access controller 210, and the output of the authentication response from the access controller 210 may be performed while an operation of initializing the storage device is performed. That is, whenever power is applied to the storage device, the access controller 210 and the host 400 may authenticate whether the storage device (or the memory device 100) is accessed by a registered user through an authentication request and an authentication response.

Figure 5:
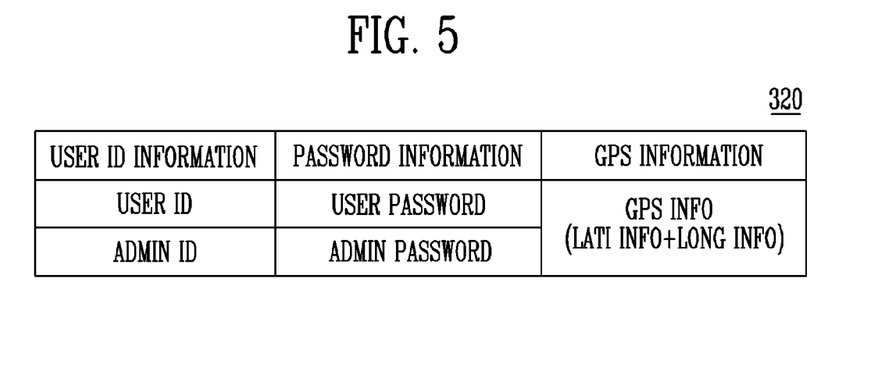
FIG. 5 is a diagram illustrating an example of user information stored in a user information storage of FIG. 1.

FIG. 5 is a diagram illustrating an example of user information stored in a user information storage (e.g., the user information storage 320 of FIG. 1).

The user information storage 320 may include user information and administrator information. The user information may include user ID information, password information, and position information (e.g., GPS information).

The user information stored in the user information storage 320 may be registered user information. In FIG. 5, the registered user information may include a registered user ID (USER ID), a registered user password (USER PASSWORD), and registered user position information (GPS INFO). Here, the registered user position information (GPS INFO) may be the position information of the storage device (e.g., the storage device 50 including the memory device 100) occurring when the registered user information is generated. The registered user position information (GPS INFO) may include information about latitude and longitude.

The administrator information may include an administrator ID (ADMIN ID), an administrator password (ADMIN PASSWORD), and administrator position information (GPS INFO).

As described above with reference to the embodiment of FIG. 4, the registered user position information may be identical to administrator position information. That is, authentication of the administrator may be performed by comparing registered user position information with position information occurring when authentication is requested.

Figure 6:
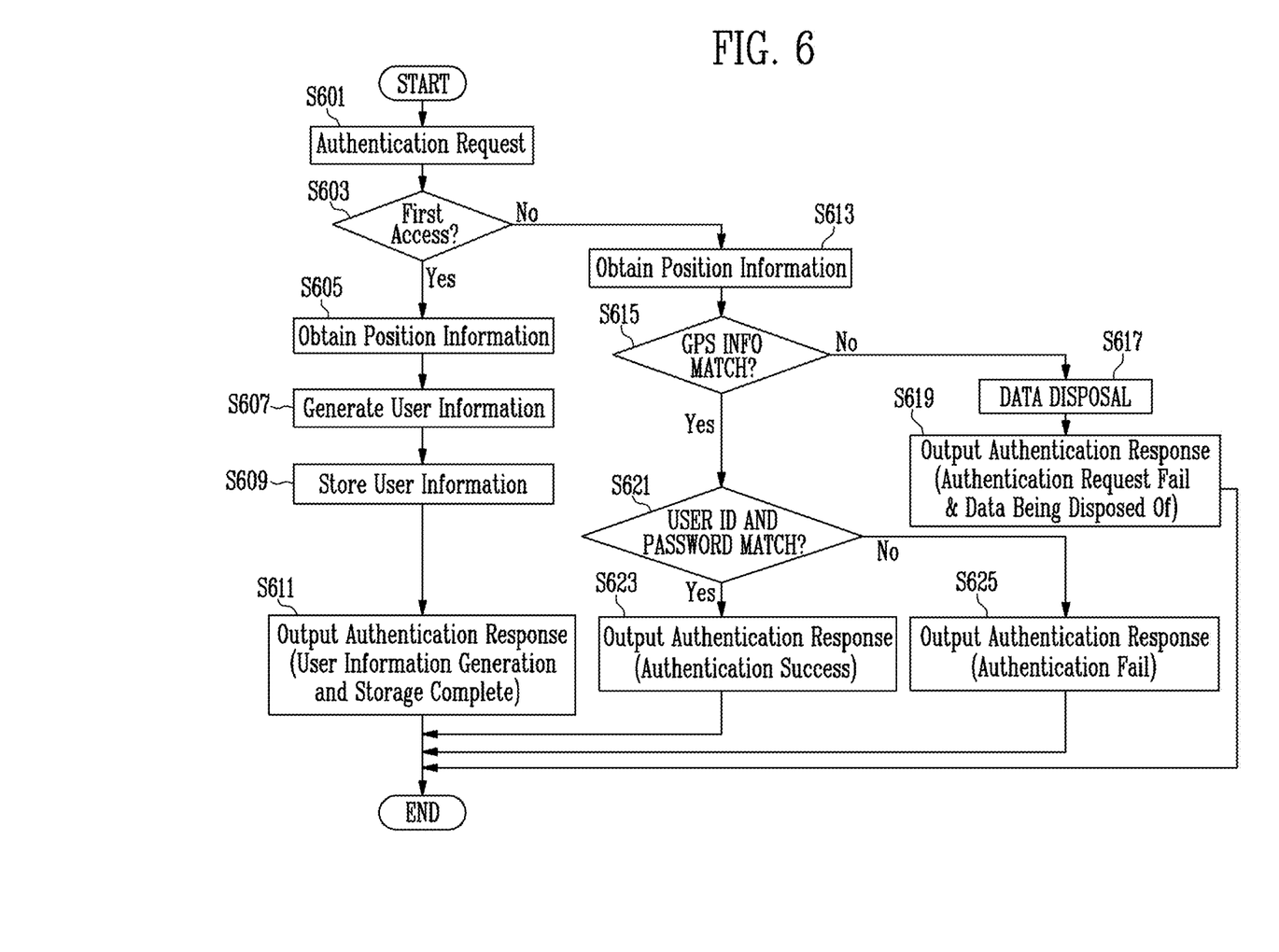
FIG. 6 is a flowchart illustrating a method of operating a storage device according to an embodiment of the present disclosure.

FIG. 6 is a flowchart illustrating a method of operating a storage device according to an embodiment of the present disclosure.

Referring to FIG. 6, at step S601, the storage device may receive an authentication request from a host.

At step S603, the storage device may determine whether a user ID and a password contained in the authentication request correspond to information of a new user required to be registered or correspond to an access request made by a previously registered user. When it is determined that the user ID and the password contained in the authentication request correspond to information of a new user required to be registered, the process may proceed to step S605, otherwise the process may proceed to step S613.

At step S605, the storage device may obtain position information. The position information may include latitude information and longitude information. The position information may be obtained by the position information generator included in the storage device. The position information may be information encrypted using an encryption algorithm.

At step S607, the storage device may generate user information. The user information may include the user ID and the password contained in the authentication request and the position information obtained at step S605. The user information may be encrypted using an encryption algorithm.

At step S609, the storage device may store the generated user information. The user information may be stored in a volatile memory device and then be stored in a nonvolatile memory device before the power of the storage device is interrupted. For example, data stored in the user information storage 320, described above with reference to FIG. 1, may be stored in the memory device 100 before the power of the storage device is interrupted.

At step S611, the storage device may output an authentication response indicating that the generation and storage of the user information have been completed to the host.

At step S613, the storage device may obtain position information. The position information may include latitude information and longitude information. The position information may be obtained by the position information generator included in the storage device. The position information may be information encrypted using an encryption algorithm.

At step S615, the storage device may determine whether the registered user position information contained in the registered user information stored in a user information storage (e.g., the user information storage 320 in FIG. 1), matches position information obtained at step S613. When it is determined that the registered user position information matches the position information obtained at step S613, the process may proceed to step S621, otherwise the process may proceed to step S617. In an embodiment, the registered user position information is determined to match the position information when a first difference between a latitude of the registered user position information and that of the position information and a second difference between a longitude of the registered user position information and that of the position information each are equal to or less than a given value. In an embodiment, each of the registered user position information and the position information may include latitude, longitude, and altitude, and the registered user position information is determined to match the position information when a first difference between a latitude of the registered user position information and that of the position information, a second difference between a longitude of the registered user position information and that of the position information, and a third difference between an altitude of the registered user position information and that of the position information each are equal to or less than a given value.

At step S617, the storage device may dispose of data included in a memory device (e.g., the memory device 100 in FIG. 2). Disposal of the data may be performed using an operation of erasing memory blocks in which the data is stored, among memory blocks included in the memory device. In an embodiment, disposal of data may be performed by deleting a map table stored in the user information storage 320, described above with reference to FIG. 1, or by performing an unmap operation of releasing mapping relationships between logical block addresses and physical block addresses included in the map table, to make the data stored in the memory device inaccessible.

At step S619, the storage device may provide an authentication response indicating that the authentication request has failed and the data stored in the memory device has been disposed of.

At step S621, the storage device may determine whether the registered user ID and the registered user password included in the registered user information match the user ID and the password, respectively, contained in the authentication request. When it is determined that the registered user ID and the registered user password match the user ID and the password, respectively, contained in the authentication request, the process may proceed to step S623, otherwise the process may proceed to step S625.

At step S623, the storage device may output an authentication response indicating that authentication has succeeded to the host.

At step S625, the storage device may output an authentication response indicating that authentication has failed to the host.

Figure 7:
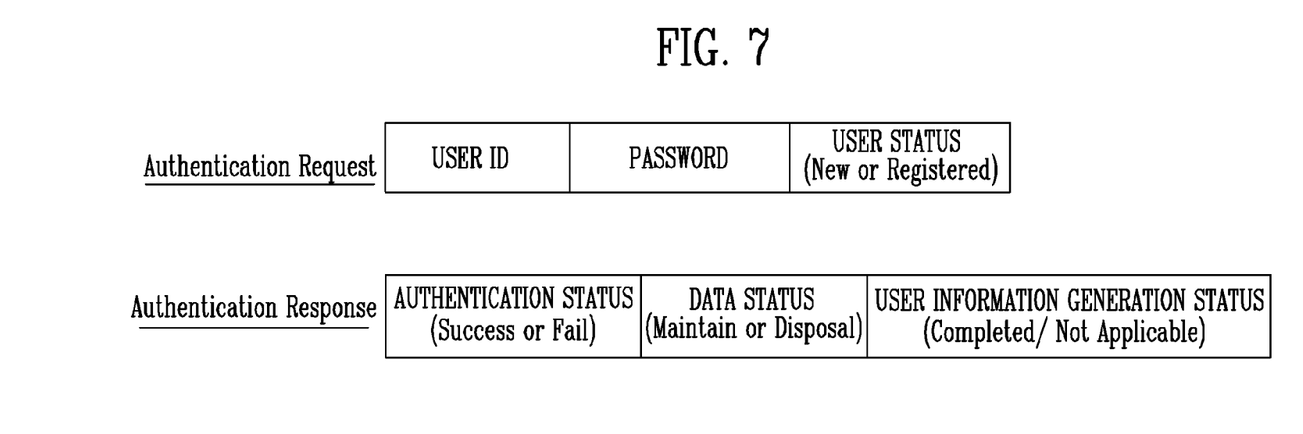
FIG. 7 is a diagram for explaining information contained in an authentication request and an authentication response according to an embodiment of the present disclosure.

FIG. 7 is a diagram for explaining information contained in an authentication request and an authentication response according to an embodiment of the present disclosure.

Referring to FIG. 7, an authentication request may include a user ID (USER ID), a user password (PASSWORD), and user status information (USER STATUS). The user status information (USER STATUS) may be information indicating whether a user ID and a password contained in the authentication request correspond to information of a new user required to be registered or correspond to an access request made by a previously registered user. For example, the case where the user status information (USER STATUS) is "New" may mean that the user ID and the password correspond to information of a new user required to be registered and the case where the user status information (USER STATUS) is "Registered" may mean that the user ID and the password contained in the authentication request correspond to an access request made by the previously registered user.

The authentication response may be a response provided by the memory controller in response to the authentication request. The authentication response may include authentication state information (AUTHENTICATION STATUS), data status information (DATA STATUS), and user information generation status information (USER INFORMATION GENERATION STATUS).

The authentication status information (AUTHENTICATION STATUS) may be information indicating whether authentication has succeeded or failed.

The data status information (DATA STATUS) may be information indicating whether data has been maintained or disposed of.

The user information generation status information (USER INFORMATION GENERATION STATUS) may be information indicating that user information for the user ID and the user password contained in the authentication request have been generated and stored.

Figure 8:
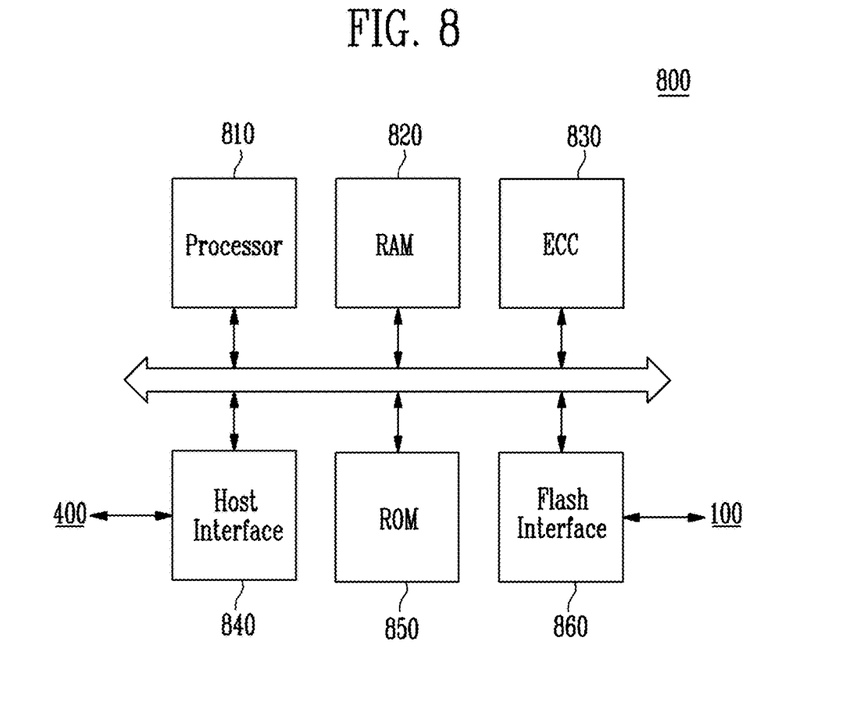
FIG. 8 is a diagram illustrating an embodiment of a memory controller of FIG. 1.

FIG. 8 is a diagram illustrating an embodiment of the memory controller 200 of FIG. 1.

Referring to FIG. 8, a memory controller 800 may include a processor 810, a RAM 820, an error correction circuit (ECC) 830, a host interface 840, a ROM 850, and a flash interface 860.

The processor 810 may control the overall operation of the memory controller 800. The RAM 820 may be used as a buffer memory, a cache memory or a working memory of the memory controller 800. In an example, the access controller 210, described above with reference to FIG. 1, may be stored in the RAM 820 or the ROM 850 in the form of software included in firmware run by the processor 810. The user information storage 320, described above with reference to FIG. 1, may be the RAM 820 included in the memory controller 800, as in the embodiment of FIG. 8.

The ROM 850 may store various types of information required for the operation of the memory controller 800 in the form of firmware.

The memory controller 800 may communicate with an external device (e.g., the host 400, an application processor or the like) through the host interface 840.

The memory controller 800 may communicate with the memory device 100 through the flash interface 860. The memory controller 800 may transmit a command CMD, an address ADDR, a control signal CTRL, etc. to the memory device 100 and receive data DATA from the memory device 100, through the flash interface 860. In an example, the flash interface 860 may include a NAND interface.

Figure 9:
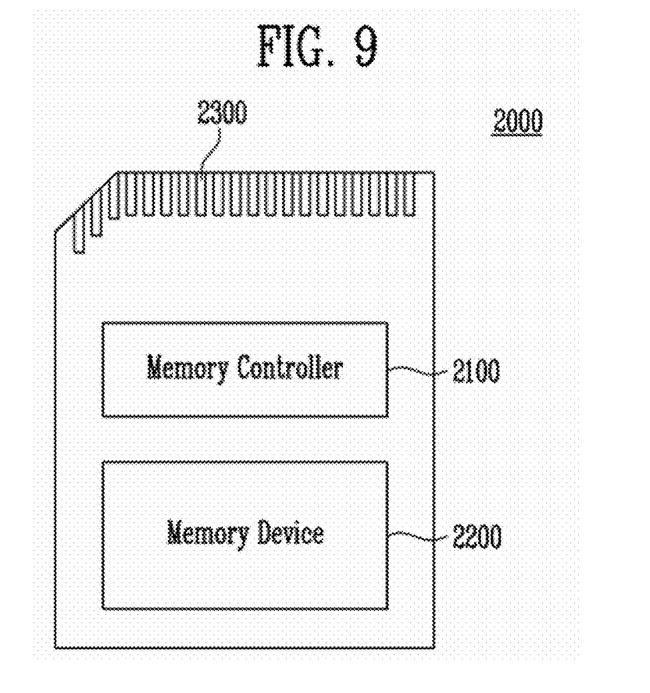
FIG. 9 is a block diagram illustrating a memory card system to which a storage device according to an embodiment of the present disclosure is applied.

FIG. 9 is a block diagram illustrating a memory card system to which a storage device according to an embodiment of the present disclosure is applied.

Referring to FIG. 9, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, program, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200, described above with reference to FIG. 1.

In an embodiment, the memory controller 2100 may include components, such as a RAM, a processor, a host interface, a memory interface, and an ECC unit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), a Spin Transfer Torque magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash (CF) card, a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 10:
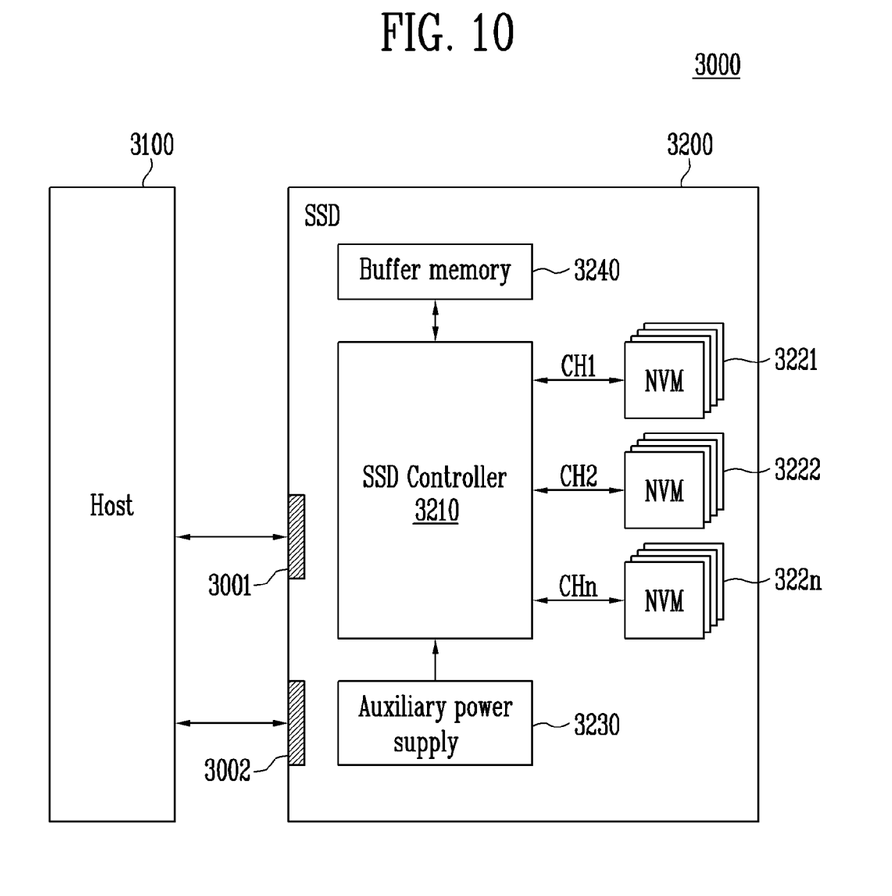
FIG. 10 is a block diagram illustrating a solid state drive (SSD) system to which a storage device according to an embodiment of the present disclosure is applied.

FIG. 10 is a block diagram illustrating a solid state drive (SSD) system to which a storage device according to an embodiment of the present disclosure is applied.

Referring to FIG. 10, an SSD system 3000 may include a host 3100 and an SSD 3200. The SSD 3200 may exchange signals with the host 3100 through a signal connector 3001 and may receive power through a power connector 3002. The SSD 3200 may include an SSD controller 3210, a plurality of nonvolatile memories 3221 to 322n, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash nonvolatile memories 3221 to 322n in response to the signals received from the host 3100. In an embodiment, the signals may be signals based on the interfaces of the host 3100 and the SSD 3200. For example, the signals may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of nonvolatile memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 11:
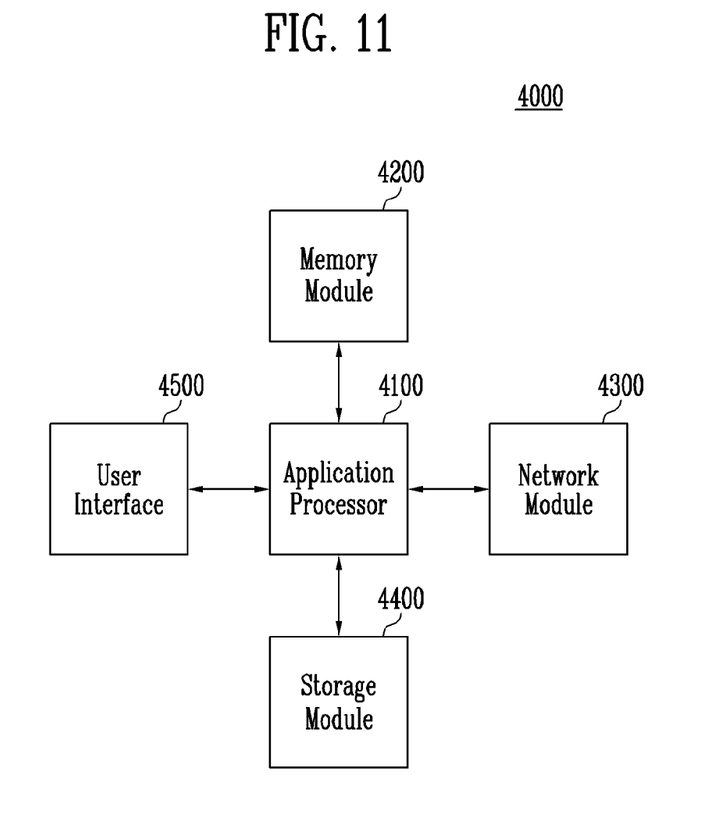
FIG. 11 is a block diagram illustrating a user system to which a storage device according to an embodiment of the present disclosure is applied.

FIG. 11 is a block diagram illustrating a user system to which the storage device according to an embodiment of the present disclosure is applied.

Referring to FIG. 11, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a storage device for providing an improved security function and a method of operating the storage device.

What is claimed is:

1. A storage device, comprising:
a nonvolatile memory device;
a position information generator configured to generate first position information indicating a first geographical position of the nonvolatile memory device when an authentication request is input;
a user information storage configured to store user information for accessing the nonvolatile memory device, the user information including second position information; and
an access controller configured to, in response to an authentication request provided from an external host, obtain the first position information from the position information generator, and dispose of data stored in the nonvolatile memory device depending on whether the second position information included in the user information matches the first position information.

2. The storage device according to claim 1, wherein the authentication request includes a user ID, a password corresponding to the user ID, and user status information indicating whether the user ID and the password correspond to information of a new user or information of a previously registered user.

3. The storage device according to claim 2, wherein the access controller comprises:
a user information generator configured to generate registered user information including the user ID, the password corresponding to the user ID, and the first position information obtained when the authentication request is input based on the user status information; and
an authentication controller configured to store the registered user information in the user information storage as the user information by controlling the user information storage and to provide an authentication response to the external host, the authentication response indicating that the registered user information has been stored.

4. The storage device according to claim 3, wherein the user information generator individually encrypts the user ID, the password, and the first position information obtained when the authentication request is input.

5. The storage device according to claim 2, wherein the user information includes:
   a registered user ID of a registered user of the nonvolatile memory device;
   a registered user password corresponding to the registered user ID; and
   registered user position information that is the second position information indicating a second geographical position of the nonvolatile memory device when the user information is stored.

6. The storage device according to claim 5, wherein the access controller is configured to control the position information generator to generate the first position information in response to the authentication request, and to determine whether the user ID and the password match the registered user ID and the registered user password, respectively, when the registered user position information matches the first position information.

7. The storage device according to claim 6, wherein the access controller is further configured to, when the user ID does not match the registered user ID, or the password does not match the registered user password, or both, provide an authentication response to the external host, the authentication response indicating that the authentication request has failed.

8. The storage device according to claim 6, wherein the access controller is configured to, when the user ID and the password match the registered user ID and the registered user password, respectively, provide an authentication response to the external host, the authentication response indicating that the authentication request has succeeded.

9. The storage device according to claim 1, wherein the access controller is configured to, when the second position information included in the user information does not match the first position information, provide an erase command to the nonvolatile memory device to delete the data stored in the nonvolatile memory device.

10. The storage device according to claim 9, wherein the access controller provides an authentication response to the external host, the authentication response indicating that the authentication request has failed and the data stored in the nonvolatile memory device has been disposed of.

11. The storage device according to claim 1, wherein the position information generator generates the first position information based on information provided by a global positioning system (GPS).

12. A method of operating a storage device, the storage device including a nonvolatile memory device and a memory controller for controlling the nonvolatile memory device, the method comprising:
   in response to an authentication request for the storage device that is input from an external host, generating first position information indicating a first geographical position of the storage device when the authentication request is input; and
   disposing of data stored in the nonvolatile memory device depending on whether the first position information matches second position information included in registered user information, the registered user information having been stored before the authentication request is input.

13. The method according to claim 12, wherein generating the first position information comprises encrypting information about a latitude and a longitude at which the storage device is located when the authentication request is input.

14. The method according to claim 12, further comprising:
   obtaining the second position information by decrypting the registered user information; and
   comparing the second position information with the first position information.

15. The method according to claim 14, further comprising:
   obtaining a user ID and a password included in the authentication request when the second position information matches the first position information; and
   providing a result of the authentication request depending on whether the user ID and the password match a registered ID and a registered password, respectively, the registered ID and the registered password being included in the registered user information.

16. The method according to claim 15, wherein providing the result of the authentication request comprises providing an authentication response to the external host, the authentication response indicating that the authentication request has succeeded, when the user ID and the password match the registered ID and the registered password, respectively.

17. The method according to claim 15, wherein providing the result of the authentication request comprises providing an authentication response to the external host, the authentication response indicating that the authentication request has failed, when the user ID does not match the registered ID, or the password does not match the registered password, or both.

18. The method according to claim 14, wherein disposing of the data stored in the nonvolatile memory device comprises disposing of the data stored in the nonvolatile memory device when the second position information does not match the first position information, the method further comprising providing an authentication response to the external host, the authentication response indicating that the authentication request has failed and the data stored in the nonvolatile memory device has been disposed of.

19. The method according to claim 18, wherein disposing of the data comprises erasing one or more memory blocks included in the nonvolatile memory device.

20. The method according to claim 18, wherein disposing of the data comprises releasing mapping relationships between logical block addresses provided by the external host and physical block addresses of the nonvolatile memory device.

* * * * *